Figure 1:
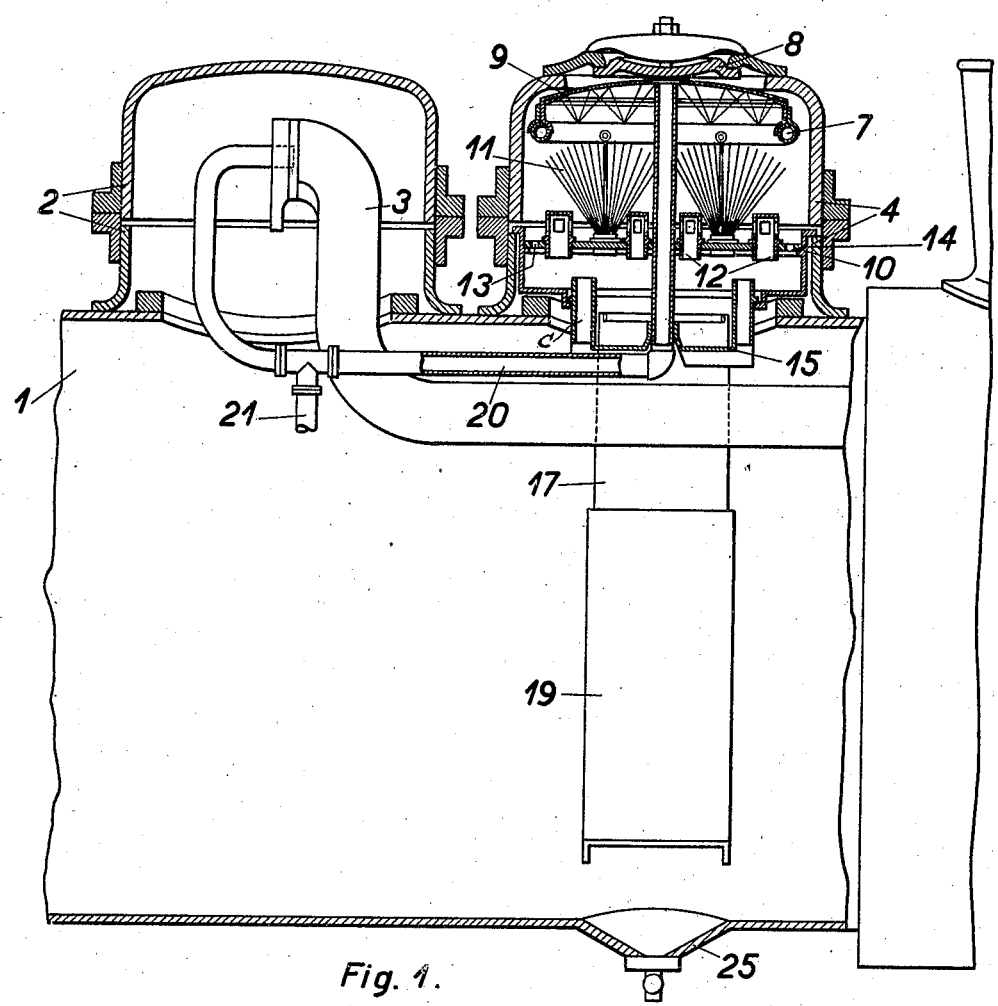

Nov. 13, 1923.  1,474,218
F. WAGNER
WATER PURIFYING SYSTEM FOR LOCOMOTIVES
Filed Feb. 17, 1921  8 Sheets-Sheet 1

Inventor:
Fritz Wagner

Nov. 13, 1923.   1,474,218
F. WAGNER
WATER PURIFYING SYSTEM FOR LOCOMOTIVES
Filed Feb. 17, 1921     8 Sheets-Sheet 3

Inventor:

Nov. 13, 1923. 1,474,218
F. WAGNER
WATER PURIFYING SYSTEM FOR LOCOMOTIVES
Filed Feb. 17, 1921 8 Sheets-Sheet 4

Inventor:
Fritz Wagner

Nov. 13, 1923. 1,474,218
F. WAGNER
WATER PURIFYING SYSTEM FOR LOCOMOTIVES
Filed Feb. 17, 1921 8 Sheets-Sheet 6

Inventor:
Fritz Wagner
by
C. W. Fairbank
atty

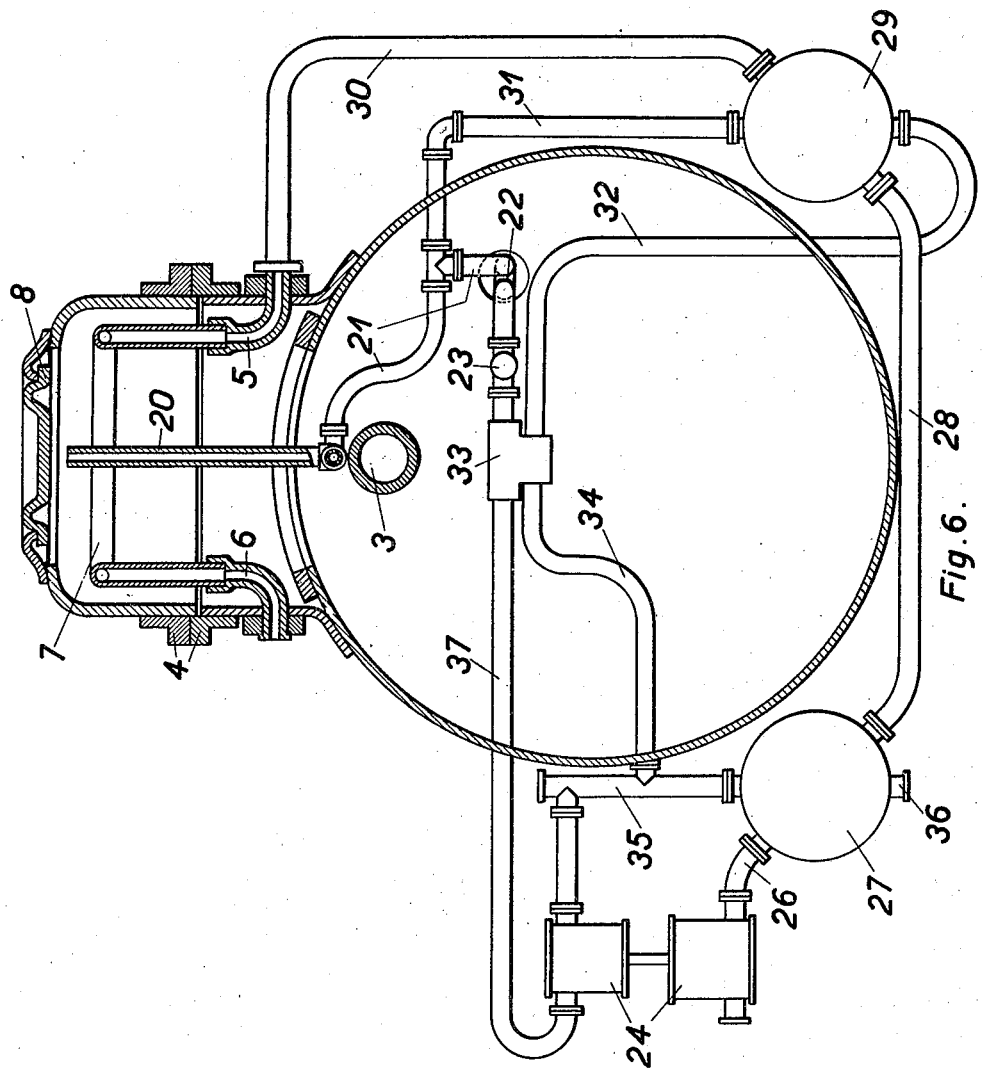

Nov. 13, 1923.  
F. WAGNER  
1,474,218  
WATER PURIFYING SYSTEM FOR LOCOMOTIVES  
Filed Feb. 17, 1921  
8 Sheets-Sheet 8

Inventor:  
Fritz Wagner

Patented Nov. 13, 1923.

1,474,218

UNITED STATES PATENT OFFICE.

FRITZ WAGNER, OF BERLIN-LICHTERFELDE, GERMANY.

WATER-PURIFYING SYSTEM FOR LOCOMOTIVES.

Application filed February 17, 1921. Serial No. 445,857.

*To all whom it may concern:*

Be it known that I, FRITZ WAGNER, a citizen of the Republic of Germany, and a resident of Berlin-Lichterfelde, Germany, have invented certain new and useful Improvements in Water-Purifying Systems for Locomotives, of which the following is a specification.

Apart from a few rare exceptions every kind of natural water contains dissolved solid substances and gases, which are separated if the water is sufficiently heated. The solid substances, thus separated are then deposited as sediment or scale on the heated walls of the vessel (steam boiler or the like), and the gases are mixed with the steam.

Since increase of temperature impairs the resistance to strain of the copper sheet or of the sheet of other material forming the wall or tube of the boiler, it follows that sediments in steam boilers endanger their safety in operation. Also the sediment or scale result in considerable economical disadvantages as to the consumption of fuel. In the case of sediment of only 3 mm. thickness, these losses amount to about 9% of the total utilization of heat.

If the gases which have been separated from the feed-water, remain in the steam boilers for a considerable time, they result in corrosions of the boiler walls, thereby diminishing the safety in operation and the life of the boilers to a considerable extent.

For these reasons, attempts have been made to soften the water, that is to free the feed-water from the solutions previous to its entrance into the boiler.

These attempts have proved very successful in the case of stationary boilers, where there is always sufficient space for the arrangement of the purifying plant, so that a large proportion of steam boilers are at present fed with soft water only.

The situation is entirely different with locomotive boilers. Although this kind of boilers must necessarily evaporate considerably larger quantities of water within a unit of time than stationary boilers of the same size, and although the injurious effects of the sediments of feed water are especially felt in locomotive boilers, they are still ordinarily fed with hard water.

The construction of the locomotives renders it impossible to arrange purifiers, which have proved useful in the case of stationary boilers, of sufficient size upon locomotive boilers. Insufficiently dimensioned purifiers are incapable of heating the feed water, fed within the unit of time to the temperature required for separating the sediments, and to deposit them in such a manner that they are not detrimental to the boiler. All attempts to soften the feed water also in the case of locomotive boilers by heating it outside the boiler, have not yet led to satisfactory results.

The invention relates to a system for softening the feed water used in locomotives.

In this system the feed water is likewise softened by heating it to temperatures required for the separation of the matters in solution, before it comes into contact with the parts of the locomotive boiler touched by the fire-gases.

My invention includes an arrangement for heating the feed water in a counter-current to the locomotive whether the latter be in motion or at rest. The invention also includes an arrangement for continually discharging the gases from the purifiers as well as means for depositing the sediment and for periodically removing the latter from the purifying plant. Finally, the invention includes a method for extending the short purifying periods, which are so troublesome to the service, without impairing the efficiency of the installation.

Figure 2:
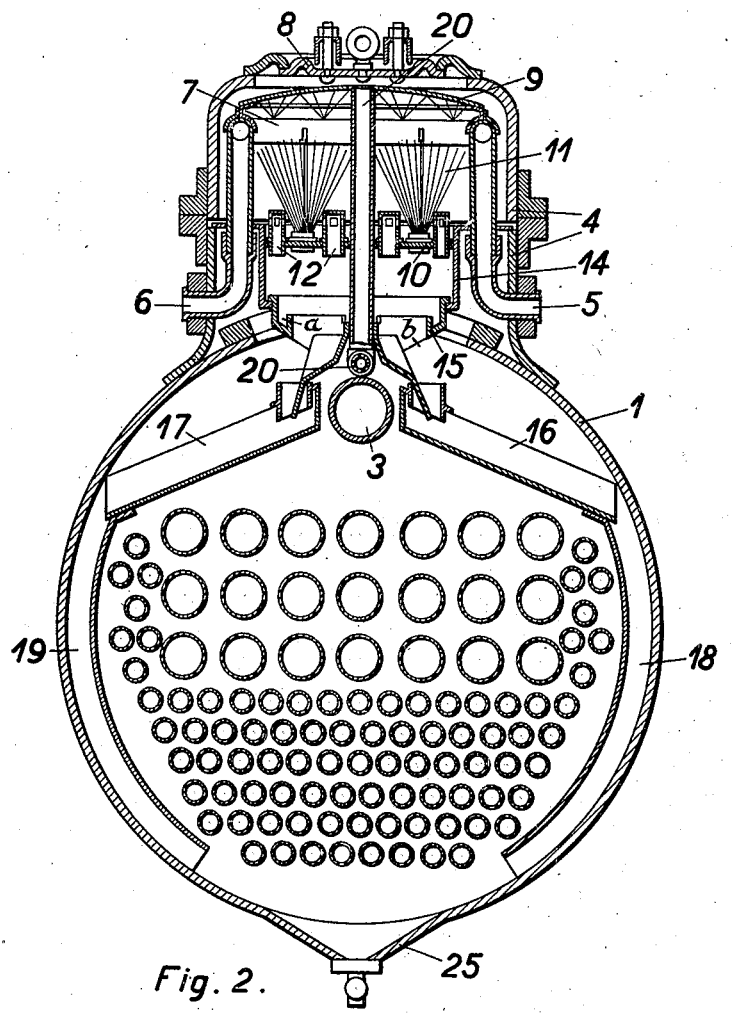
Figure 3:
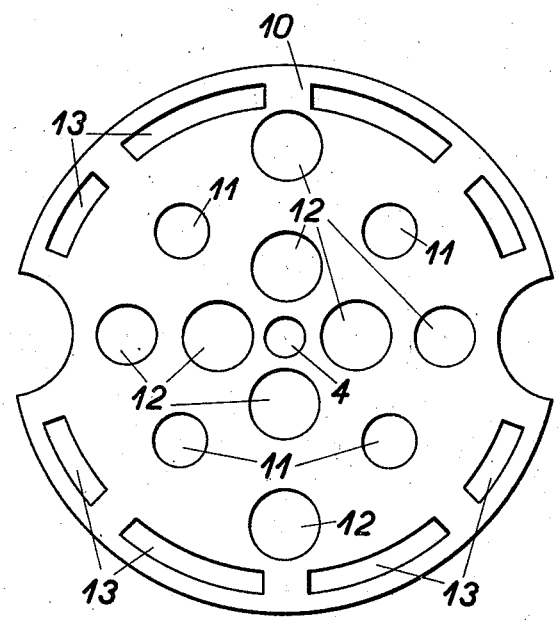
Figure 7:
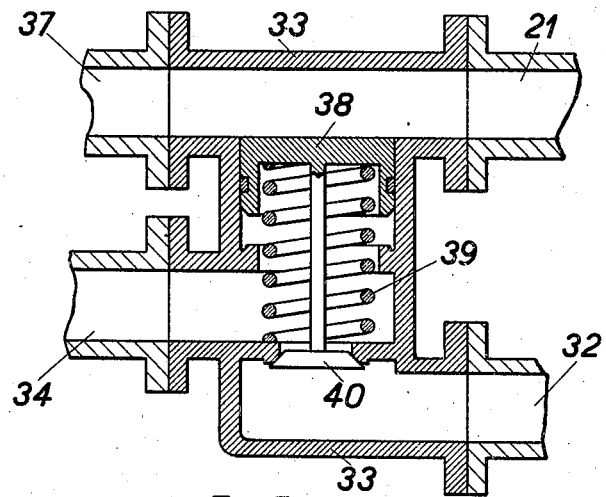
Figure 4:
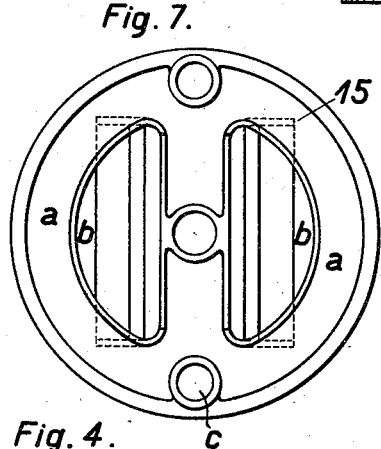
Figure 5:
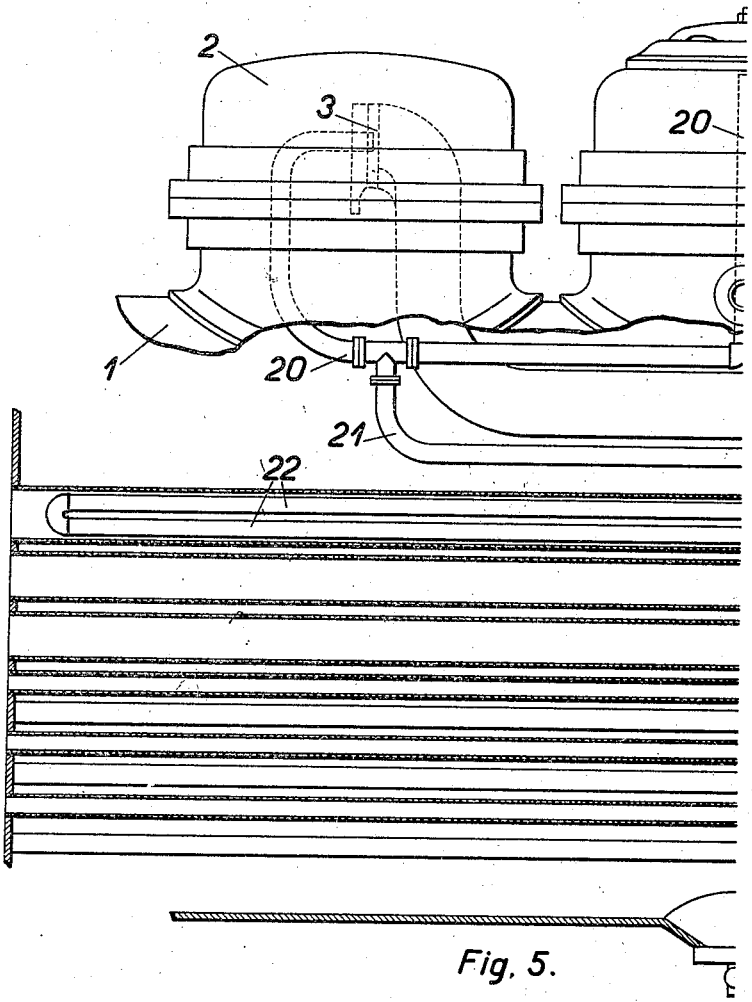
Figure 5:
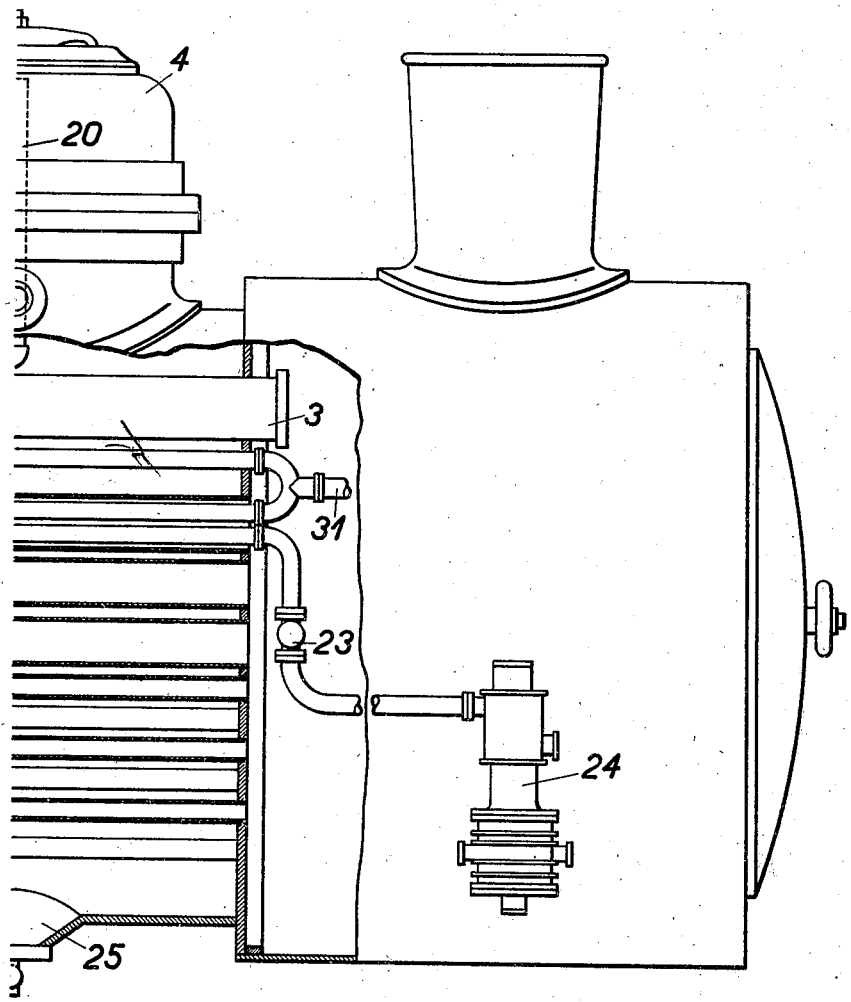
Figure 8:
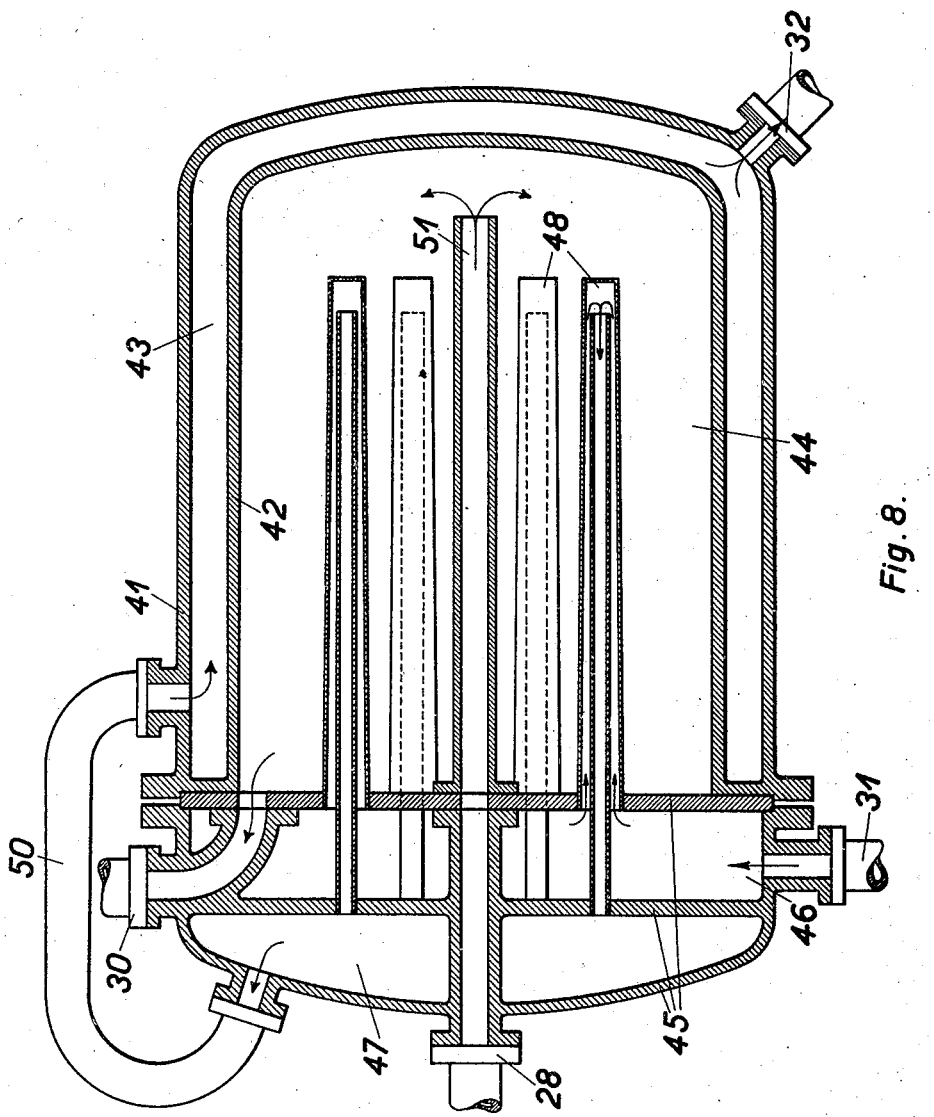

In the accompanying drawings:

Figs. 1 and 2 represent longitudinal and transverse sections through a locomotive-boiler and the purifying plant, Figs. 3 and 4 are plans of detail parts shown in Figs. 1 and 2, Fig. 5 is a side elevation of certain of the piping, Fig. 6 is a transverse section showing an arrangement for fractional separation, certain parts being omitted, Fig. 7 is a detail of a valve; and Fig. 8 is a diagram of a further form.

As shown in Fig. 1, the locomotive-boiler 1 is provided with two steam-domes. The steam for driving the locomotive is taken from the rear dome 2 through the inlet pipe 3, while the feed water is softened in the front dome 4. The two vertical pipes 5 and 6 (Fig. 2) provided in the front dome 4, are connected with the injector and with the steam feed pump respectively. Both pipes are connected with the annular pipe 7, provided with a number of suitably arranged small openings towards the cover of the dome. The cap of the dome is provided with a manhole, closed by the cover 8 pressed by the steam against its seat. Below the cover of the manhole there is a wire-gauze 9, while below the latter there is a plate 10 with conical steel-wire brushes 11, flues 12 and openings 13. The plate 10, shown in Fig. 3, is arranged in the member 14, suspended from the joint of the dome, which serves at the same time for the reception of the member 15. The member 15, shown in Fig. 4, has portions projecting into two troughs 16 and 17, the open lower ends of which deliver into the conduits 18 and 19. These are formed by the boiler wall and bent sheets of metal riveted to the wall. These conduits project to points near the bottom of the boiler. A pipe 20 has a vertical portion centrally disposed in the dome and a connecting portion which projects into the open end of the inlet pipe 3 or near thereto. A branch pipe 21 of this pipe 20 is connected with one end of a superheated element 22, as shown in Fig. 5, while the other end of this element is connected with the steam feed pump 24 controlled by the stop-valve 23.

The plant works as follows:

The steam from the boiler fills the dome 4, passing through the openings $b$ and the flues $c$ of the element 15 and through the flues 12 and the openings 13 of the plate 10. If, after opening the throttle, which may be, for instance, arranged in the smoke-box, the locomotive is set in motion, the working steam passing from the rear dome 2 through the inlet pipe 3, produces a strong suction-action upon the pipe 20. By this means, the steam is introduced from the upper part of the front dome 4 into the inlet pipe 3, thereby producing a strong current of steam, which passes from the boiler into the dome 4. This current of steam through the dome 4 is increased, if the various appliances on the locomotive and which use steam, as for instance the steam feed-pump 24 also take steam from the dome. The current of steam passing through the dome 4 not only heats all parts of the dome, but prevents a decrease of the temperature when delivering feed water to the locomotive. The water, so fed, is discharged from the openings of the annular pipe 7 against the inner wall of the cover of the dome and the wire gauze below the cover of the dome. By this means, the water is converted into spray. This spray drops through the rising fresh steam towards the boiler so as to come into intimate contact therewith. As the interchange of heat between the steam and the sprays becomes the more perfect, the longer this intimate contact between both is maintained, provision had to be made for retarding the spray on its way to the boiler. For this purpose, the wire brushes 11 have been provided. The spray drops from the brushes 11 on to the plate 10 heated by the steam, and flows on the upper side to the periphery, to there drop through the openings 13. It then strikes against the edge of the baffle element 14, thereby converting it again into spray, which drops into the member 15. This latter is provided with a groove $a$, which carries the water towards its central portion from whence it flows into the two troughs 16 and 17. The groove $a$, prevents the steam from being cut off from the openings $b$ and the flues $c$ by a water-wall. The water then flows from the troughs 16 and 17 through the conduits 18 and 19 along the jacket wall towards the bottom of the boiler.

By this means, the dome 4 is permanently flooded by a current of fresh steam, so that, on entering the dome, the water continuously flows through pipes and falls through spaces, the temperature of which remains nearly the same as that of the boiler steam. The fall of the spray is retarded on its way from the top of the dome into the boiler by the brushes 11, plate 10 and the baffle elements 14 and 15, which have the temperature of the boiler steam. These obstacles maintain the spray and vary the direction of flow. Thus, the water comes into intimate contact for a relatively long time, with the heat-carriers. Consequently, the water is quickly heated to the temperature required for the separation of the matters in solution, while the solid substances have sufficient time to deposit on the obstacles (brushes, plate, etc.). The few solid substances, existing in the water, are finally deposited in the sump 25. To attain this, the two passages 18 and 19 are arranged symmetrically in respect to the axis of the boiler in such a manner that the two currents of water leaving them, meet each other from opposite directions, and their speed is suddenly slackened so that the sediments have time to sink into the sump, before the feed water participates in the flow of the water contained in the boiler.

The gases separated from the water are carried off with the steam passing to the machines, since the separation takes place in the annular pipe 7 or immediately after the water has left the said pipe.

The steam taken from the front dome 4, is, of course, highly aqueous. If now, this steam is to be used for operating feed and air pumps, it should be previously dried. Consequently the pipe 21 is connected with one end of a superheater element 22 (Fig. 5) while the other end is connected with the feed pump 24 across the stop-valve 23.

Large quantities of sediment cannot be retained in the dome, so that the dome must from time to time be cleaned. To attain this in a convenient manner, the cap of the dome 4 is provided with a manhole closed by a cover 8, pressed by the steam against its seat. (Figs. 1 and 2.) The wire gauze 9 and the plate 10 are composed of single parts which are of such size that they can be removed from the manhole. For the same purpose, the maximum diameter of the brushes 11 is smaller than the minimum diameter of the manhole.

It is obvious that, besides the removal of the sediment in this way, the plant should from time to time be thoroughly cleaned. For this purpose, the cap of the dome 4 should be removed which requires considerable time and causes great inconveniences to the service. All measures allowing of extending the periods of cleaning the plant are therefore highly valuable for the service.

As is well known, sediment consists of different kinds of salts, each kind of salt having a special temperature for separation. Some salts are separated if the heat exceeds 100° C., while others require more than 140° C.

This characteristic feature of the sediment has been utilized in my system to extend the periods of cleaning. The method employed for this purpose consists in heating the feed water in purifiers divided by fractions, said fractions being so connected with each other that the purifier of the lower fraction is always heated with the exhaust-steam from the purifier of the higher fraction. The exhaust-steam from the purifier of the lowest fraction is conveyed to the feed-water preheater heated by the exhaust-steam of the locomotive.

By means of this gradual heating method of the feed-water part of the sediment is deposited in the purifier of the lowest fraction. The remainder of the sediment, which is conveyed to the purifier of the higher fraction, is then deposited in this purifier and so on. By this means, the space for depositing the sediments is essentially larger, as compared with the arrangement according to Figs. 1 and 2. For this reason, the periods of cleaning the plant may be extended, without impairing the efficiency of the plant.

Fig. 6 shows a diagrammatic view of the method of purifying the feed water divided into fractions. The front dome 4 is likewise provided with the devices shown in Figs. 1 and 2, though they are not shown in Fig. 6. Between the dome 4 and the preheater 27 a purifier 29 is provided at a convenient point of the locomotive. These three apparatus are so connected with each other that the water forced by the feed-pump 24 into the preheater 27 through the pipe 26 passes through the pipe 28, the purifier 29, pipe 30 and pipe 5 into the front dome 4, in which it is finally softened in the usual manner. A branch-pipe 31, connected with the branch-pipe 21 and the pipe 20, leads into the purifier 29. The purifier 29 is connected with the pipe 35 by means of the pipe 32 and valve 33 and the pipe 34. Through the pipe 35 the exhaust steam of the locomotive passes into the preheater 27. Besides, one side of the valve 33 is connected with the stop-valve 23 and the latter with the superheater element 22, while its other side is connected with the water-pump 24 by means of the pipe 37. The exhaust steam of the water pump 24 leads into the pipe 35. The preheater 27 is connected with the atmosphere by means of the pipe 36. The object of the valve 33 is to maintain the communication between the pipes 32 and 34 as long as the feed pump 24 is in operation and to interrupt the communication when the pump is shut off.

Fig. 7 shows one form of execution of the valve 33. If the stop-valve 23 is opened so that the pump begins to work, the steam passing into the pump will force the piston 38 in the valve casing 33 downwards, thereby opening the spring pressed valve plate 40, so that the pipes 32 and 34 are in communication with each other. Consequently, the steam passes from the front dome 4 through the pipes 20, 21, and 31 into the purifier 29, thence through the pipe 32, the valve 33 and the pipes 34 and 35 into the preheater 27, from which it passes as condensed water into the open air through the pipe 36. Thus, the currents of steam and water again act according to the counter-current principle. By closing the valve 23 the valve-plate 40 is closed under the action of the spring 39, thereby interrupting the passage of steam from the front dome 4 to the atmosphere. By this means, each water feeding process produces automatically the counter-current of the steam necessary for heating the water, and, as soon as the feeding process ceases the counter-current of steam is also interrupted.

Fig. 8 shows one form of the fraction-purifier.

The purifier consists of two cylindrical vessels 41 and 42, the walls of which form chambers 43 and 44. The chamber 44 is closed by the cover 45, which is provided with three walls forming the chambers 46 and 47. The steam passes from the front dome 4 through the pipe 31 into the chamber 46, thence through the pipes 48 and 49 into the chamber 47. The chamber 47 is connected with chamber 43 by means of the pipe 50. The chamber 43 is connected with the chamber 46 in the cover of the purifier of the lower fraction, or, if no such purifier exists, with the valve 33 by means of the pipe 32 and so on. The feed water passes from the preheater 27 through the pipe 28, which is connected with the pipe 51, into the chamber 44 of the purifier and thence through the pipe 30 into the front dome 4.

The drawings show only an example for the arrangement and construction of the water purifying system, and I do not restrict myself to this form of construction. For example, only one fraction purifier 29 is shown in Fig. 6 between the feed water preheater 27 and the front dome 4. It is clear that, instead of one such purifier, several purifiers may be connected in series. Furthermore, it is clear that one fraction purifier may be arranged in the smoke box of the locomotive. In this case it is heated by the combustion gases of the locomotive. Thus, the connection between this purifier and the preheater and the dome is limited to the water supply.

Having now particularly described and ascertained the nature of my said invention, and in what manner the same is to be performed, I declare that what I claim is:

1. A steam boiler having two steam domes one having the main steam outlet therefrom, means for delivering feed water to the upper part of the other dome, and means for withdrawing steam from the upper part of the last mentioned dome to induce an upflow of steam in the last mentioned dome in direct countercurrent contact with the descending feed water.

2. A steam boiler having a dome or chamber mounted upon the boiler shell and in open communication with the interior thereof for the admission of live steam from the boiler, means for delivering feed water to the upper portion of the dome and permitting it to descend in a finely sub-divided state, and means for withdrawing steam from the upper portion of the dome to cause an upflow of steam in the dome and in countercurrent relationship to the descending feed water.

3. A steam boiler having a dome or chamber mounted on the boiler shell and in open communication with the interior thereof for the admission of live steam from the boiler, means for spraying feed water into the upper portion of the dome and means for withdrawing steam from the upper portion of the dome to cause an upflow of steam through the descending spray.

4. A steam boiler having a dome mounted thereon and in open communication at the lower end thereof with the interior of the boiler for the admission of live steam, means for delivering feed water to the upper portion of said dome, and a metallic brush within said dome and within the path of the descending feed water and serving to insure intimate contact between the counter-currents of feed water and steam and to afford surfaces for the deposit of sediment released from the water.

5. A steam boiler having a dome mounted thereon and in open communication at the lower end thereof with the interior of the boiler for the admission of live steam, means for delivering feed water to the upper portion of said dome, and a metallic brush within said dome and within the path of the descending feed water and serving to insure intimate contact between the counter-currents of feed water and steam and to afford surfaces for the deposit of sediment released from the water, and means for withdrawing steam from the upper portion of the dome above the point of delivery of the feed water.

6. A steam boiler having a dome mounted thereon and in open communication at the lower end thereof with the interior of the boiler for the admission of live steam, a transversely disposed, reticulated plate in the upper portion of said dome, means for spraying feed water upwardly against said plate, and means for withdrawing steam from said dome at a point above said plate.

7. A steam boiler having a dome mounted thereon and in open communication at the lower end thereof with the interior of the boiler for the admission of live steam, a transversely disposed wire gauze in the upper portion of said dome, means for spraying feed water upwardly against said gauze, and means for withdrawing steam from said dome at a point above said wire gauze.

8. A steam boiler having a dome mounted thereon and in open communication at the lower end thereof with the interior of the boiler for the admission of live steam, a transversely disposed wire gauze spaced below the top of the dome, means for delivering water to said gauze and means for withdrawing steam from the dome at a point above said gauze.

9. A steam boiler having a dome mounted thereon and in open communication at the lower end thereof with the interior of the boiler for the admission of live steam, a conical wire brush projecting upwardly within said dome, means for spraying water into the upper portion of said dome and permitting the spray to fall on to said brush.

10. A steam boiler having a dome mounted thereon and in open communication at the lower end thereof with the interior of the boiler for the admission of live steam, a plate mounted within said dome and having flues for the passage of steam upwardly therethrough, a wire brush supported by said plate and extending upwardly therefrom, and means for delivering feed water to said brush.

11. A steam boiler having a dome mounted thereon and in open communication at the lower end thereof with the interior of the boiler for the admission of live steam, a plate mounted within said dome and having flues for the passage of steam upwardly therethrough, a wire brush supported by said plate and extending upwardly therefrom, and means for spraying feed water into the upper portion of said dome and permitting it to fall by gravity onto said brush.

12. A steam boiler having a dome including two superposed tubular sections joined together, a transverse plate supported at the joint between said sections, and having vertical flues for the upflow of steam, and apertures for the downflow of water, means for delivering water to the upper portion of the dome, and means for withdrawing steam from the upper portion.

13. A steam boiler having a dome including two superposed tubular sections joined together, a transverse plate supported at the joint between said sections, and having vertical flues for the upflow of steam and apertures for the downflow of water, means for delivering water to the upper portion of the dome, means for withdrawing steam from the upper portion, and a plurality of brushes supported by said transverse plate and in the path of movement of the ascending steam and descending water.

14. A steam boiler having a dome, a transverse partition plate therein having flues extending therethrough for the upflow of steam and apertures for the downflow of water, means for withdrawing steam from the upper portion of the dome, means for delivering feed water to the upper portion of the dome, and a member disposed beneath said plate and having an aperture therethrough, and a trough for receiving the water flowing downwardly through the apertures of said plate.

15. A steam boiler having a dome, means for delivering feed water to the upper end thereof, means for withdrawing steam from the upper end thereof, said dome having its lower end in open communication with the interior of the boiler, a transverse member adjacent to the lower end of the dome and having a brush for receiving and collecting the water descending in the dome, and a pair of transverse troughs for delivering water from said trough to the opposite sides of the boiler.

16. A construction as defined in claim 15, in which there are provided conduits extending from the ends of the second mentioned troughs to the lower portion of the boiler.

17. A steam boiler having a dome, means for delivering feed water to the upper portion thereof, the lower end of the dome being open to receive live steam from the boiler, a pair of oppositely disposed downwardly inclined troughs within the boiler for receiving the water flowing from said dome, and a pair of ducts formed of bent metal sheets attached to the inner surface of the boiler and extending downwardly along opposite sides thereof for conducting water from said troughs to the lower portion of the boiler.

18. A steam boiler having a pair of domes each in open communication at its lower end to the interior of the boiler, means for delivering feed water to the upper portion of one of said domes, a suction pipe leading from the upper part of the other dome for conducting steam to be employed for performing work and a steam pipe leading from the upper portion of the first mentioned dome to a point adjacent the intake of the suction pipe in the second mentioned dome, whereby there is induced an upflow of steam in the first mentioned dome.

19. A steam boiler having a dome, a steam pipe leading from the upper portion thereof whereby upflow of steam through the dome is induced, and means for causing water to flow in a finely sub-divided state through said dome counter-current to the upflow of steam.

20. A steam boiler having a pair of domes, a steam pipe leading from the upper part of one dome, a steam pipe leading from the upper part of the other dome and terminating adjacent to the inlet of the first mentioned steam pipe, and means for delivering feed water to the second mentioned dome.

21. A steam boiler having a steam dome, a pipe for delivering feed water to the upper part thereof and permitting it to descend in a finely sub-divided state, a steam pipe leading from the upper portion of said dome and means for reheating the steam withdrawn through said pipe, to counteract the cooling effect thereon of the feed water in contact with which said steam passes on its way to said pipe.

22. A locomotive steam boiler having two separate steam domes, means for delivering feed water for the boiler to the upper part of one dome, water purifying means in said dome, a main steam outlet leading from the upper portion of the other dome, and means for supplying to said outlet steam from the upper portion of the first mentioned dome.

Signed at Berlin, Germany, this 20th day of December 1920.

FRITZ WAGNER.